(12) United States Patent
Kawai

(10) Patent No.: US 6,546,060 B1
(45) Date of Patent: Apr. 8, 2003

(54) DIRECT MODULATING FSK TRANSMITTER FOR MCA

(75) Inventor: Kazuo Kawai, Tokyo (JP)

(73) Assignee: General Research of Electronics, Inc., Tokyo (JP)

(*) Notice: Subject to any disclaimer, the term of this patent is extended or adjusted under 35 U.S.C. 154(b) by 0 days.

(21) Appl. No.: 09/233,288

(22) Filed: Jan. 19, 1999

(30) Foreign Application Priority Data

Apr. 23, 1998 (JP) .......................................... 10-129548

(51) Int. Cl.[7] .............................................. H04L 27/12
(52) U.S. Cl. ...................... 375/303; 375/297; 375/306; 375/376; 332/100
(58) Field of Search ................................ 375/303, 306, 375/308, 211, 272, 322, 334, 376, 269, 274, 295, 297, 305, 307; 331/10, 14, 16, 44; 332/100, 103, 127, 128; 327/105, 147, 156

(56) References Cited

U.S. PATENT DOCUMENTS

| | | | | | |
|---|---|---|---|---|---|
| 5,438,703 A | * | 8/1995 | Ng et al. | ...................... | 455/127 |
| 5,850,597 A | * | 12/1998 | Tanaka et al. | ............... | 455/115 |
| 5,900,785 A | * | 5/1999 | Freed | ........................... | 331/10 |
| 5,940,457 A | * | 8/1999 | Dreifuss et al. | ............ | 375/376 |

* cited by examiner

*Primary Examiner*—Shuwang Liu
(74) *Attorney, Agent, or Firm*—Flynn, Thiel, Boutell & Tanis, P.C.

(57) ABSTRACT

A direct modulating frequency shift keying transmitter for multi channel access is constructed so that a transmission signal from a voltage controlled oscillator (VCO) in a phase lock loop frequency synthesizer is output through a buffer amplifier and a transmitting power amplifier, and a modulation signal is applied to the VCO. In the transmitter, in order to cancel instantaneous deviation of a transmission frequency due to ON of the transmitting power amplifier, an ON/OFF control signal is applied to the transmitting power amplifier.

1 Claim, 1 Drawing Sheet

DIRECT MODULATING FSK TRANSMITTER FOR MCA

FIELD OF THE INVENTION

The present invention relates to an improvement of a direct modulating FSK transmitter for MCA (Multi Channel Access) and in particular to a circuit construction for eliminating instantaneous frequency deviation in an FSK (Frequency Shift Keying) transmitter wherein a data signal is transmitted by means of direct modulating method.

DESCRIPTION OF THE PRIOR ART

In an FSK transmitter of direct modulation type for MCA, a VCO (voltage Controlled Oscillator) for direct modulation is controlled by a frequency synthesizer having a PLL (Phase Lock Loop) so as to oscillate with an object frequency of a predetermined channel. Thus, when the frequency synthesizer is set by a channel setting instruction and the PLL operates, after its response time lapses, the frequency of said VCO arrives at the object frequency of the predetermined channel. A transmitting power amplifier of a following stage is let to be off because the frequency is not set correctly yet until it arrives at this object frequency. A portion of a frequency divider and a phase detector in the frequency synthesizer is formed by an LSI (Large Scale Integrated) circuit and when the frequency arrives at the object frequency and the PLL becomes in synchronized condition, the frequency synthesizer produces a lock-in signal indicating completion of synchronized condition. Accordingly, when the lock-in signal is provided, since the VCO has been set to the object frequency already, the transmitting power amplifier becomes ON and a modulating signal is inputted to the VCO to start transmission of data.

However, when the transmitting power amplifier is caused to be ON, the following problem happens.

That is, an output of the VCO is connected to the transmitting power amplifier through a buffer amplifier and ON/OFF of a transmitting power is done by ON/OFF of a power supply of the transmitting power amplifier. An input impedance of the transmitting power amplifier is varied by ON/OFF of the power supply thereof. Variation of this impedance influences a load impedance of the VCO through a feedback capacity of the buffer amplifier so as to make it vary and thus the frequency of the VCO varies. However, since an output frequency of the VCO is controlled by the PLL synthesizer, if instantaneous frequency variation happens, correcting action is done automatically thereafter.

In this way, channel setting is done, so that correct frequency is set but when the transmitting power amplifier becomes ON, said output frequency is instantaneously pulled down immediately thereafter and then is pulled up to the correct frequency again by means of response operation of the PLL.

In other words, there are such drawbacks that a signal having frequency error is outputted instantaneously and thus transmission of data must be waited until the output frequency is pulled up to the correct frequency. In particular, with respect to a FSK signal, since information is transmitted in frequency domain, frequency error influences the information directly. Of course, since range of this frequency deviation becomes small if design for making the feedback capacity of the buffer amplifier be greatly small is done, influence of the frequency error can be made small but since the impedance of the feedback capacity becomes large as treated frequency becomes high even if the feedback capacity is small, it is difficult to make said influence small.

SUMMARY OF THE INVENTION

In view of the above mentioned present situation, an object of the invention is to provide a direct modulating FSK transmitter for MCA having a simple correcting circuit for making a carrier frequency not deviate or its deviation lay within an allowable range even if the transmitting power amplifier becomes ON.

In order to attain the above object the subject matter of the invention is to construct a direct modulating FSK transmitter for MCA so as to cancel frequency deviation of a transmission signal by applying an ON/OFF control signal to a voltage controlled oscillator for direct modulation in the direct modulating FSK transmitter for MCA wherein after a PLL frequency synthesizer is locked to an object frequency of a predetermined channel, the modulation signal is applied to the voltage controlled oscillator for direct modulation in the PLL frequency synthesizer and the transmitting power amplifier is caused ON in response to the ON/OFF control signal to output the transmission signal outputted from the voltage controlled oscillator through the transmitting power amplifier.

In the invention the voltage controlled oscillator may be constructed so as to have a variable capacity diode to which the transmission signal is applied, and so as to add the ON/OFF control signal to the variable capacity diode through a register.

In the transmitter, the variable capacity diode is used as an element for making the frequency of the VCO variable and PLL operation is obtained by applying a frequency control voltage from a phase detector and the transmission signal to it. So, since a load capacity of the VCO increases and a transmission frequency becomes low instantaneously by making the transmitting power amplifier ON in an ordinary construction, frequency deviation owing to ON of the transmitting power amplifier can be cancelled by applying the ON/OFF control voltage to the variable capacity diode to correct it.

A direct modulating FSK transmitter for MCA of the invention is constructed so that the frequency deviation of a transmission signal owing to ON of the transmitting power amplifier can be cancelled by applying the ON/OFF control signal to the VCO for direct modulation on the basis of the above mentioned idea.

DESCRIPTION OF THE PREFERRED EMBODIMENTS

An embodiment of a direct modulating FSK transmitter for MCA of the invention will be explained by referring to drawings as follows.

Figure 1:
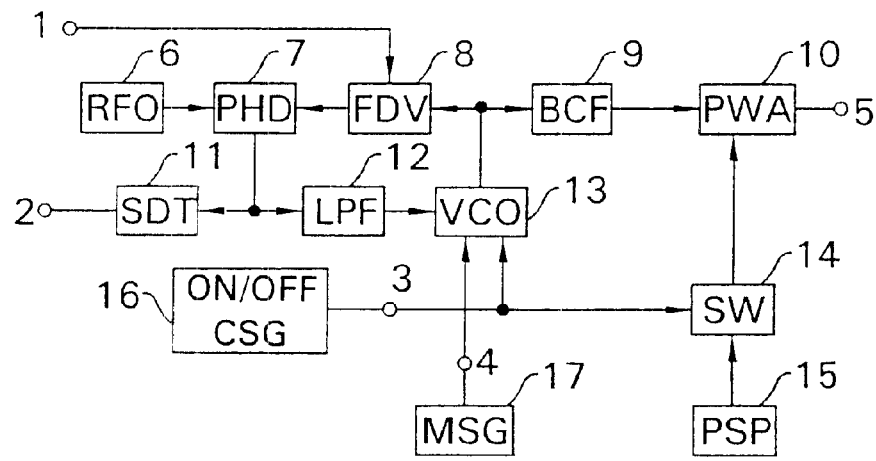
FIG. 1 is a block diagram for explaining an embodiment of the invention.

FIG. 1 is a block diagram showing said embodiment. In FIG. 1, reference numeral 1 is an input terminal of a data signal for channel setting; 2 is an output terminal of a lock-in signal; 3 is an input terminal of an ON/OFF control signal from an ON/OFF control signal generator (ON/OFF CSG) 16 of a transmitting power amplifier; 4 is an input terminal for a modulation signal output from a modulation signal generator (MSG) 17; 5 is an output of a transmission signal; 6 is a reference frequency oscillator (RFO); 7 is a phase detector (PHD); 8 is a frequency divider (FDV); 9 is a buffer amplifier; 10 is a transmitting power amplifier; 11 is a lock-in detector (SDT); 12 is a loop filter (LPF); 13 is a voltage controlled oscillator; 14 is a switch circuit (SW); 15 is a power supply (PSP).

In a transmitter of FIG. 1, a PLL circuit consisting of the reference frequency oscillator (RFO) 6, the phase detector (PHD) 7, the frequency divider (FDV) 8, the loop filter (LPF) 12 and the voltage controlled oscillator (VCO) 13 constitutes a frequency synthesizer. In channel setting, when the frequency divider (FDV) 8 is set by means of a channel setting data applied from the input terminal 1, an error voltage appears at the output of the phase detector (PHD) 7 in response thereto and this error voltage derives the voltage controlled oscillator (VCO) 13 through the loop filter (LPF) 12, so that the VCO 13 is set to an object frequency of a predetermined channel. The lock-in detector (SDT) 11 monitors the output of the phase detector (PHD) 7 and produces a lock-in signal in synchronized condition.

An output signal of the VCO 13 is applied to an input of the transmitting power amplifier (PWA) 10 through the buffer amplifier (BUF) 9. On the other hand, a supplied power voltage from the power supply (PSP) 15 is supplied to the switch circuit (SW) 14 and when the VCO 13 is set to the object frequency by the lock-in signal, the power-voltage is supplied to the transmitting power amplifier 10 through the switch circuit 14 to provide the transmission signal. At this time, as previously mentioned, since drop of an input impedance of the transmitting power amplifier 10 (mainly, increase of an input capacity thereof) causes to increase a total capacity of a response circuit of the VCO 13 through a feedback capacity of the buffer amplifier 9, an oscillation frequency thereof is caused to drop.

So, in the invention, the transmitting power amplifier 10 is made ON and at the same time the ON/OFF control signal is applied to the VCO 13 to cancel drop portion of the oscillation frequency. A construction example of the VCO 13 to do so is shown in a circuit diagram of FIG. 2.

Figure 2:
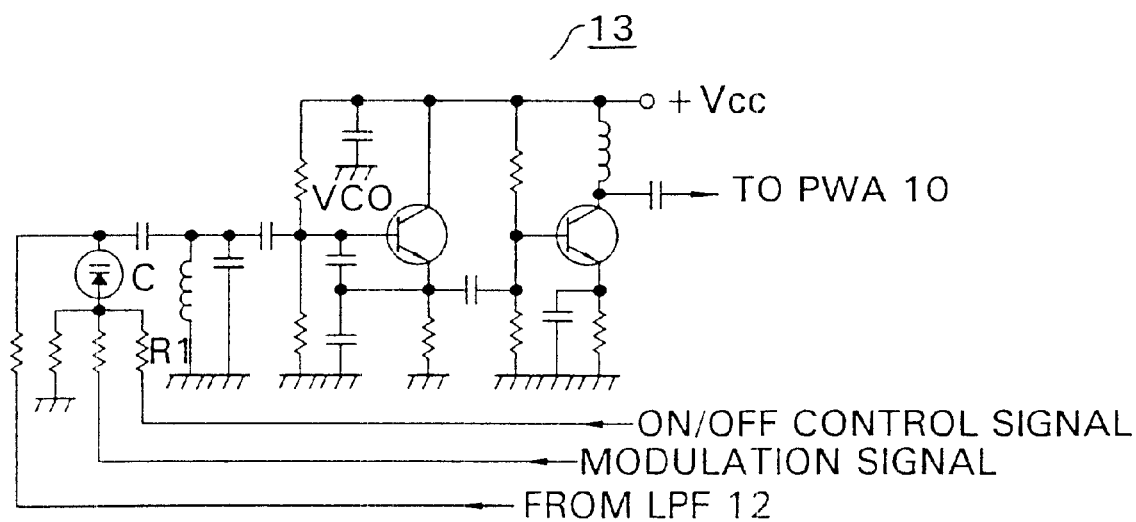
FIG. 2 is a circuit diagram showing a voltage controlled oscillator VCO which is an important construction component in FIG. 1.

FIG. 2 shows a typical circuit example of the VCO 13. As is apparent from this figure, the transmission signal applied to an anode of a variable diode C from the terminal 4 and the ON/OFF control signal from the terminal 3 is applied thereto to cancel the frequency deviation. A quantity for cancelling it can be set in accordance with the resistance value of a resistor R1. Of course, in this case, since said signal is applied to the anode of said variable capacity diode C, it is necessary to apply a negative voltage as said signal thereto in order to increase the frequency. Accordingly, also it is necessary to construct the switch circuit 14 so that it becomes ON in response to the negative voltage. In this way, the object of the invention can be attained by means of addition of only one registor R1.

As explained above according to the invention, instantaneous frequency deviation in a direct modulating FSK transmitter owing to ON of a transmitting power amplifier therein can be cancelled by means of addition of only few circuit parts thereto and thus said transmitter can constructed by only addition a very simple circuit thereto so as not to transmit a signal having frequency error.

Therefore, since it is unnecessary to wait transmission of data until correction of frequency deviation is completed, through-put thereof can be improved.

What is claimed is:

1. A direct modulating frequency shift keying transmitter for multi channel access comprising:

a phase lock loop frequency synthesizer;

a lock-in detector for locking said synthesizer to an object frequency of a predetermined channel;

a modulation signal generator for applying a modulation signal to a voltage controlled oscillator for direct modulation in said synthesizer;

an ON/OFF control signal generator for generating an ON/OFF control signal to switch a transmitting power amplifier ON in response to said ON/OFF control signal so as to enable a transmission signal output from said voltage controlled oscillator through said transmitting power amplifier; and means for adding said ON/OFF control signal to said voltage controlled oscillator to cancel frequency deviation of said transmission signal, wherein said voltage controlled oscillator includes a variable capacity diode to which said modulation signal is applied and said ON/OFF control signal is applied through a resistor.

* * * * *